(12) United States Patent
Sano et al.

(10) Patent No.: US 7,882,248 B2
(45) Date of Patent: Feb. 1, 2011

(54) CONTENT DELIVERING SYSTEM, SERVER, AND CONTENT DELIVERING METHOD

(75) Inventors: Takeshi Sano, Kawasaki (JP); Kenichi Fukuda, Kawasaki (JP); Jun Maeda, Kawasaki (JP); Masaaki Takase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 108 days.

(21) Appl. No.: 11/967,360

(22) Filed: Dec. 31, 2007

(65) Prior Publication Data
US 2008/0201484 A1    Aug. 21, 2008

(30) Foreign Application Priority Data
Feb. 19, 2007  (JP)  ............... 2007-038494

(51) Int. Cl.
*G06F 15/173* (2006.01)
*G06F 15/16* (2006.01)

(52) U.S. Cl. ............... 709/228; 709/223; 709/229

(58) Field of Classification Search ............... 709/223, 709/228–229
See application file for complete search history.

(56) References Cited
U.S. PATENT DOCUMENTS
7,324,489 B1 * 1/2008 Iyer ............... 370/338

| | | | |
|---|---|---|---|
| 2003/0101253 A1 | 5/2003 | Saito et al. | |
| 2005/0130627 A1 * | 6/2005 | Calmels et al. | 455/411 |
| 2006/0215668 A1 * | 9/2006 | Sethi et al. | 370/401 |
| 2006/0265507 A1 * | 11/2006 | Banga et al. | 709/228 |
| 2007/0223432 A1 * | 9/2007 | Badarinath | 370/338 |
| 2008/0112363 A1 * | 5/2008 | Rahman et al. | 370/331 |
| 2008/0281952 A1 * | 11/2008 | Fedotenko | 709/223 |
| 2009/0175250 A1 * | 7/2009 | Mathur et al. | 370/338 |

FOREIGN PATENT DOCUMENTS

| | | |
|---|---|---|
| JP | 2002330416 | 11/2002 |
| JP | 2002544609 | 12/2002 |
| JP | 2003169089 | 6/2003 |

* cited by examiner

*Primary Examiner*—Hussein A Elchanti
(74) *Attorney, Agent, or Firm*—Fujitsu Patent Center

(57) ABSTRACT

A receiver receives from a client, a participation request indicating that a delivery of a content is desired. An affiliated group-determining unit determines of which group corresponding to the attribute content the attribute of the user, included in the participation request is affiliated. When the other client corresponds to the same desired content and the same affiliated group as that of the participation request source client, and when the other client is already registered in a client database (DB), an access point-deciding unit decides the registered client as a access point of the participation request source client. When the other client is not registered in the client DB, the access point-deciding unit decides a delivering server as the access point of the participation request source client.

14 Claims, 13 Drawing Sheets

FIG.3

| CONTENT | ATTRIBUTE CONTENT | GROUP |
|---|---|---|
| CONTENT A | ATTRIBUTE CONTENT A1 | MALE IN TWENTIES |
| | ATTRIBUTE CONTENT A2 | FEMALE IN THIRTIES |
| | ⋮ | ⋮ |
| CONTENT B | ATTRIBUTE CONTENT B1 | HOKKAIDO |
| | ATTRIBUTE CONTENT B2 | KANTO REGION |
| | ⋮ | ⋮ |
| ⋮ | | |

FIG.4

| CLIENT ADDRESS | ATTRIBUTE | AFFILIATED GROUP | ACCESS POINT ADDRESS | ACCESSED POINT ADDRESS | CONTENT | ATTRIBUTE CONTENT |
|---|---|---|---|---|---|---|
| a.a.a.a | 25 YEAR OLD, MALE, KANAGAWA PREFECTURE, ... | MALE IN TWENTIES | x.x.x.x | b.b.b.b d.d.d.d | CONTENT A | ATTRIBUTE CONTENT A1 |
| b.b.b.b | 22 YEAR OLD, MALE, TOKYO, ... | MALE IN TWENTIES | a.a.a.a | e.e.e.e | CONTENT A | ATTRIBUTE CONTENT A1 |
| c.c.c.c | 30 YEAR OLD, FEMALE, HOKKAIDO, ... | HOKKAIDO | x.x.x.x | f.f.f.f g.g.g.g | CONTENT B | ATTRIBUTE CONTENT B1 |
| ... | | | | | | |

| ATTRIBUTE CONTENT | DATA FILE |
|---|---|
| ATTRIBUTE CONTENT A1 | ATTRIBUTE CONTENT A1.rm |
| ATTRIBUTE CONTENT A2 | ATTRIBUTE CONTENT A2.rm |
| ⋮ | ⋮ |
| ATTRIBUTE CONTENT B1 | ATTRIBUTE CONTENT B1.rm |
| ATTRIBUTE CONTENT B2 | ATTRIBUTE CONTENT B2.rm |
| ⋮ | ⋮ |

CONTENT DELIVERING SYSTEM, SERVER, AND CONTENT DELIVERING METHOD

BACKGROUND OF THE INVENTION

1. Field of the Invention

The present invention relates to a content delivering system, a server, and a content delivering method that deliver a content to a client, and more particularly to a content delivering system, a server, and a content delivering method that enable to realize a low cost and a large scale delivery of an attribute content such as an advertisement according to an attribute of a user without necessitating a network change.

2. Description of the Related Art

Recently, along with the spread of a large capacity communication line such as an asymmetric digital subscriber line (ADSL) or a fiber to the home (FTTH), Internet is increasingly used to carry out a content delivery of a moving image and the like. When using Internet to carry out the content delivery, some businesses deliver a content to a user who has carried out a paid member registration whereas some businesses insert an advertisement into the content and deliver the content to the user by using an advertisement revenue. If the content is delivered using the advertisement revenue, the user can freely view and appreciate the content that includes the inserted advertisement.

An advertisement provider who provides the advertisement expects an impact by inserting the advertisement into the content. Thus, a provider who delivers the content needs to increase an appeal of the advertisement that is inserted into the content for the user. In a technology disclosed in Japanese Patent Application Laid-open No. 2002-330416, an advertisement appropriate for an attribute of the user is inserted into the content so that the user to whom the advertisement is delivered is limited. Using the technology mentioned earlier enables to deliver the content that includes the inserted advertisement that differs according to the attribute of the user. Thus, the advertisement of a specific product or a service can be provided to the user of a particular age group or gender who is likely to be highly interested in the product or the service.

Thus, when delivering an attribute content such as the advertisement according to the attribute of the user, because a content delivering server needs to grasp the attribute of each individual user, generally unicast communication is carried out. However, in the unicast communication, a load on the server increases, thereby necessitating installation of a high performance server that can withstand the load. Further, because a network load in the vicinity of the server also increases, a network resource also needs to be strengthened, thus resulting in a significant cost for the delivery of the attribute content by using the unicast communication. To overcome the drawback, a technology is disclosed in Japanese translation of PCT international application (kohyo) No. 2002-544609 in which the users are grouped and the attribute content is delivered to multicast addresses of each group.

However, for carrying out a multicast communication to deliver the attribute content to the multicast addresses, all devices such as routers on a path, which is used to transmit the attribute content, need to be compatible with the multicast communication. Accordingly, an existing network infrastructure needs to be significantly altered. Therefore, realizing the complete multicast communication becomes difficult. Further, when carrying out the multicast communication, the attribute content cannot be delivered using a plurality of providers.

SUMMARY OF THE INVENTION

It is an object of the present invention to at least partially solve the problems in the conventional technology.

According to an aspect of the present invention, a content delivering system that delivers a content to a client through a peer-to-peer streaming includes a receiver that receives a request for content delivery from the client; a determining unit that determines, according to an attribute corresponding to the source client of the request received by the receiver, an affiliated group of the source client; a storage unit that stores data related to the source client, the data including data of the affiliated group determined by the determining unit; a deciding unit that decides, based on whether other client affiliated to the affiliated group determined by the determining unit is already registered in the storage unit, an access point of the source client for the content delivery; and a notifying unit that notifies the source client the access point decided by the deciding unit.

According to another aspect of the present invention, a server that delivers a content to a client through a peer-to-peer streaming includes a receiver that receives a request for content delivery from the client; a determining unit that determines, according to an attribute corresponding to the source client of the request received by the receiver, an affiliated group of the source client; a storage unit that stores data related to the source client, the data including data of the affiliated group determined by the determining unit; a deciding unit that decides, based on whether other client affiliated to the affiliated group determined by the determining unit is already registered in the storage unit, an access point of the source client for the content delivery; and a notifying unit that notifies the source client the access point decided by the deciding unit.

According to still another aspect of the present invention, a content delivering method is for delivering a content to a client through a peer-to-peer streaming, and includes receiving a request for content delivery from the client; determining, according to an attribute corresponding to the source client of the received request, an affiliated group of the source client; registering, in a database, data related to the source client, the data including data of the affiliated group; deciding, based on whether other client affiliated to the affiliated group is already registered in the database, an access point of the source client for the content delivery; and notifying the source client the access point decided.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic of an example of a group DB according to the first embodiment;

FIG. 4 is a schematic of an example of a client DB according to the first embodiment;

DETAILED DESCRIPTION OF THE PREFERRED EMBODIMENTS

Exemplary embodiments of the present invention are explained in detail below with reference to the accompanying drawings. In the present invention, a peer-to-peer (P2P) streaming is used for a delivery of an attribute content according to an attribute of a user. In the P2P streaming, upon receiving a content from a server, a client displays and reproduces the received content, provides the content to the user, and simultaneously transfers the content to other client. Thus, upon using the P2P streaming, because the content is replicated and transferred between the clients, a load of the server decreases and a large scale content delivery can be carried out regardless of an increase in a number of the clients.

Further, the present invention provides a server that groups clients which desire the delivery of the same content according to the attributes of the users, and that decides a connection between the clients in each group. Accordingly, a tree structure for the clients affiliated to the same group is formed, and the attribute content according to the attribute of each tree can be delivered.

Figure 1:
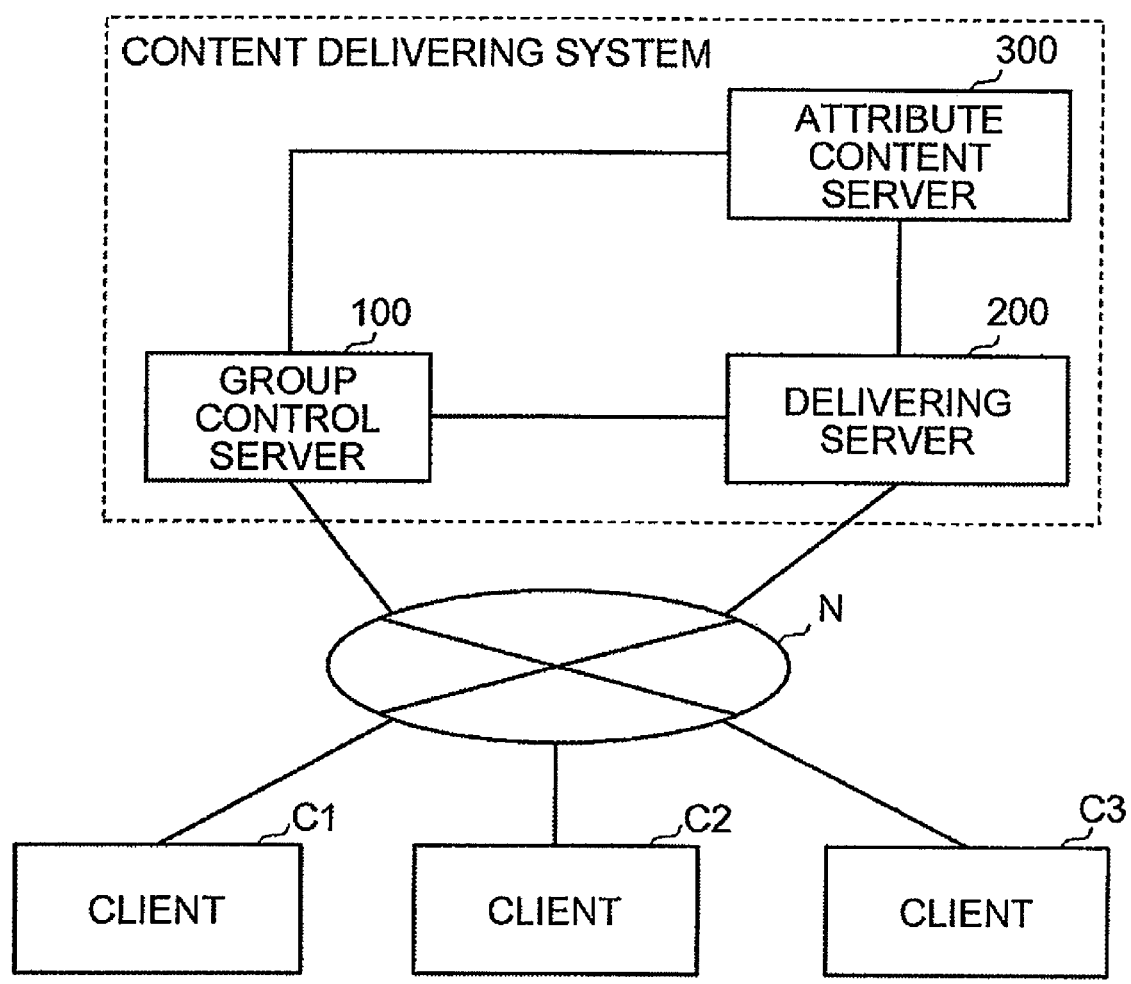
FIG. 1 is a block diagram of a network structure according to a first embodiment of the present invention.

FIG. 1 is a block diagram of a network structure according to a first embodiment of the present invention. In a network shown in FIG. 1, a plurality of clients C1 to C3 are connected to a content delivering system via a network N. The content delivering system includes a group control server 100, a delivering server 200, and an attribute content server 300. Further, the clients C1 to C3 are connected to each other via the network N.

Upon receiving from the clients C1 to C3, a participation request for a participation to a group that receives the content such as a moving image, the group control server 100 determines, from an attribute of a user such as an age group or a gender, a group in which the participation request source clients C1 to C3 is affiliated, and decides an access point of the clients C1 to C3.

To be specific, the group control server 100 determines whether other client, which corresponds to the same content desired to be delivered and the same affiliated group as that of the participation request source clients, is already registered as a delivery access point of the content. If the same client is already registered, the group control server 100 decides the registered client or the delivering server 200 as the access point of the participation request source clients C1 to C3. If the same client corresponding to the same content desired to be delivered and the same affiliated group as that of the participation request source clients is not registered, the group control server 100 decides the delivering server 200 as the access point of the participation request source clients C1 to C3. In other words, the group control server 100 forms a tree structure for the respective clients corresponding to the same content desired to be delivered and the same affiliated group, and specifies the access point of the participation request source clients.

Further, the group control server 100 receives an enquiry from the delivering server 200, and notifies the delivering server 200 the attribute content need to be delivered to the clients C1 to C3 that have issued a delivery request of the content. In other words, the group control server 100 notifies the delivering server 200 the attribute content that need to be delivered, along with the content for the group to which the clients C1 to C3 that have issued the delivery request are affiliated.

Upon receiving from the clients C1 to C3 the delivery request for the delivery of the desired content, the delivering server 200 enquires the group to which the clients C1 to C3 are affiliated from the group control server 100, combines the attribute content corresponding to the affiliated group with the content that is desired to be delivered, and delivers the content to the delivery request source clients C1 to C3. Before the transmission of the delivery request, because the access point of the clients C1 to C3 is specified by the group control server 100, the delivering server 200 receives the delivery request only from the clients C1 to C3 for which the delivering server 200 is specified as the access point.

The attribute content server 300 establishes a correspondence between the attribute content and the attribute of the user, where the attribute content is to be delivered after combining the content with the attribute content in the delivering server 200 and the user is a delivery target of the respective attribute content. The attribute content server 300 notifies the group control server 100 data of the groups that are related to the attributes of the users who are the delivery targets of the respective attribute contents. Further, the attribute content server 300 outputs to the delivering server 200 the attribute contents that are to be combined with the content.

Figure 2:
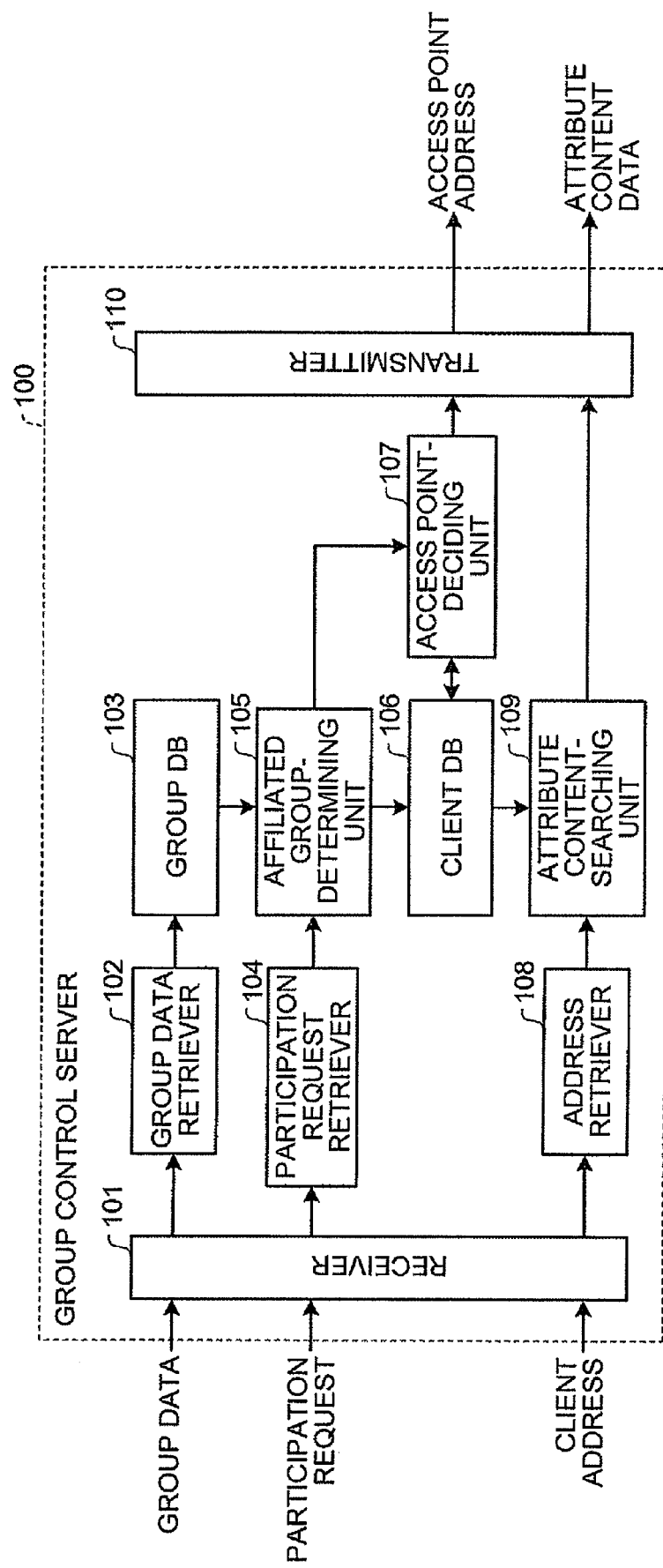
FIG. 2 is a block diagram of a group control server according to the first embodiment.

FIG. 2 is a block diagram of the group control server 100 according to the first embodiment. As shown in FIG. 2, the group control server 100 includes a receiver 101, a group data retriever 102, a group database (hereinafter, "group DB") 103, a participation request retriever 104, an affiliated group-determining unit 105, a client database (hereinafter, "client DB") 106, an access-point deciding unit 107, an address retriever 108, an attribute content-searching unit 109, and a transmitter 110.

The receiver 101 receives group data related to grouping of the user who is the delivery targets of the respective attribute content, receives the participation request for participation to the group in order to receive the delivery of the content, and receives a client address of the client that has issued the delivery request. To be specific, the receiver 101 preliminarily receives from the attribute content server 300 the group data that indicate the attributes of the users who are the delivery targets, regarding the attribute contents that are assigned to the contents. Further, the receiver 101 receives from the client the participation request indicating that the client is desired to participate in any one of the groups that is classified according to the group data and desired to receive the delivery of the content. The participation request includes identification data of the content that the user desire to be delivered, and the attribute such as the age group, the gender, and the address of the user. Further, after the delivering server 200 has received the delivery request from the client, the receiver 101 receives from the delivering server 200 the client address of the delivery request source client.

The group data retriever 102 retrieves from the attribute content server 300 the group data that is received by the receiver 101, and registers in the group DB 103 the group of the attribute that is the delivery target of the respective attribute content.

The group DB 103 establishes and stores therein a correspondence between the attribute content which is assigned to the content delivered from the delivering server 200 and the group of the attribute of the user who is the delivery target of the respective attribute content. To be specific, as shown in FIG. 3, the group DB 103 establishes and stores therein a correspondence between the attribute content and the group related to the attribute of the user such as "male in twenties," "Kanto region," and the like. In other words, for example, "attribute content A1," "attribute content A2," and the like are assigned to "content A" that is delivered from the delivering server 200, and "male in twenties" is the delivery target of "attribute content A1."

The participation request retriever 104 retrieves the participation request received by the receiver 101 from the client, and notifies the affiliated group-determining unit 105 the identification data of the desired content and the attribute of the user. Here, the identification data and the attribute of the user are included in the participation request.

The affiliated group-determining unit 105 refers to the group DB 103, and determines, from the attribute contents that are assigned to the content desired by the user, the affiliated group corresponding to the attribute of the user that is included in the participation request. Next, the affiliated group-determining unit 105 establishes a correspondence between the address of the participation request source client and the attribute of the user, the affiliated group, and the like, and registers the established correspondence in the client DB 106. Further, the affiliated group-determining unit 105 notifies the access point-deciding unit 107 the affiliated group of the participation request source client.

The client DB 106 stores therein the data related to the participation request source client. To be specific, as shown in FIG. 4, the client DB 106 establishes and stores therein a correspondence among the client address and the attribute of the user, the affiliated group, an access point address that indicates the address of a higher connected client or the delivering server 200, an accessed point address that indicates the address of a lower connected client, the content that is desired to be delivered, and the attribute content that is assigned to the content.

The access point-deciding unit 107 refers to the client DB 106, and determines whether other client, which corresponds to the same desired content and the same affiliated group as the participation request source client, is already registered in the client DB 106. If the other client corresponding to the same desired content and the same affiliated group as the participation request source client is already registered in the client DB 106, the access point-deciding unit 107 determines whether the registered client is suitable as a higher client of the participation request source client based on a number of clients that are connected below the registered client, a geographical distance between the registered client and the participation request source client, and the like.

If the registered client is suitable as the higher client, the access point-deciding unit 107 decides the registered client as the access point of the participation request source client. If the registered client is not suitable as the higher client or if the registered client does not exist, the access point-deciding unit 107 decides the delivering server 200 as the access point of the participation request source client. Next, the access point-deciding unit 107 registers the decided access point in the client DB 106. If the registered client is the decided access point, the access point-deciding unit 107 adds the address of the participation request source client to the accessed point address of the recorded client.

Further, the access point-deciding unit 107 transmits the decided access point to the participation request source client via the transmitter 110.

The address retriever 108 retrieves from the delivering server 200 the client address that is received by the receiver 101, and outputs the client address to the attribute content-searching unit 109.

The attribute content-searching unit 109 searches from the client DB 106 the attribute content corresponding to the client address, and transmits to the delivering server 200 via the transmitter 110 attribute content data that indicates the attribute content.

The transmitter 110 transmits the access point address to which the participation request source client accesses and the attribute content data of the attribute content that need to be assigned to the content by the delivering server 200. In other words, the transmitter 110 transmits the access point address to the participation request source client, and further transmits the attribute content data to the delivering server 200.

Figure 5:
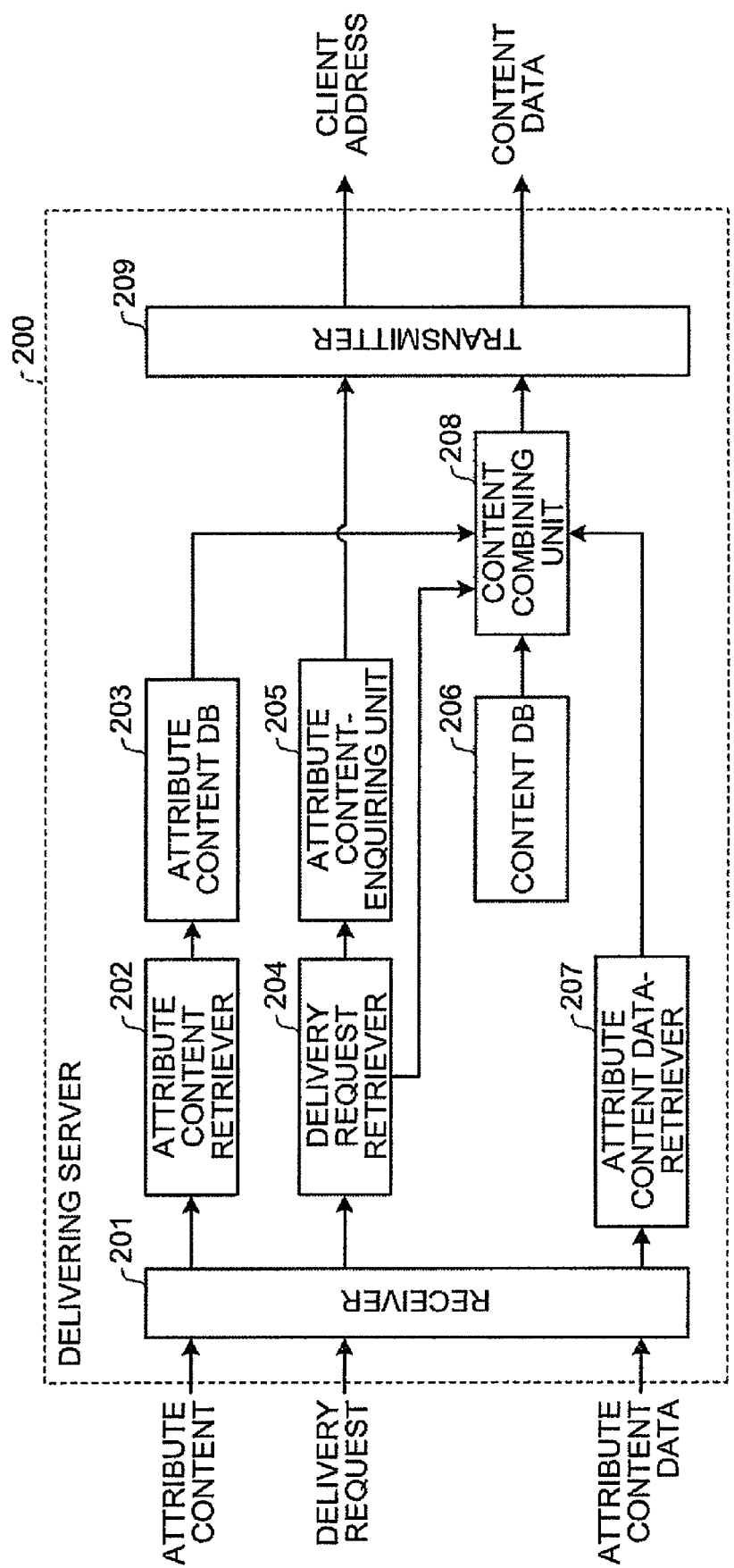
FIG. 5 is a block diagram of a delivering server according to the first embodiment.

FIG. 5 is a block diagram of the delivering server 200. As shown in FIG. 5, the delivering server 200 includes a receiver 201, an attribute content retriever 202, an attribute contents database (hereinafter, "attribute content DB") 203, a delivery request retriever 204, an attribute content-enquiring unit 205, a content database (hereinafter, "contents DB") 206, an attribute content data-retriever 207, a content combining unit 208, and a transmitter 209.

The receiver 201 receives the attribute content such as the advertisement that is assigned to the content, receives the delivery request that requests the delivery of the content, and receives the attribute content data of the attribute content that need to be delivered to the delivery request source client. To be specific, the receiver 201 preliminarily receives from the attribute content server 300 the attribute content that is likely to be assigned to the content. Further, the receiver 201 receives from the client the delivery request for the delivery of the desired content. Further, the receiver 201 receives from the group control server 100 the attribute content data corresponding to the address of the delivery request source client.

The attribute content retriever 202 retrieves from the attribute content server 300 the attribute content data that is received by the receiver 201, and stores the retrieved attribute content data in the attribute content DB 203.

Figures 6, 7:
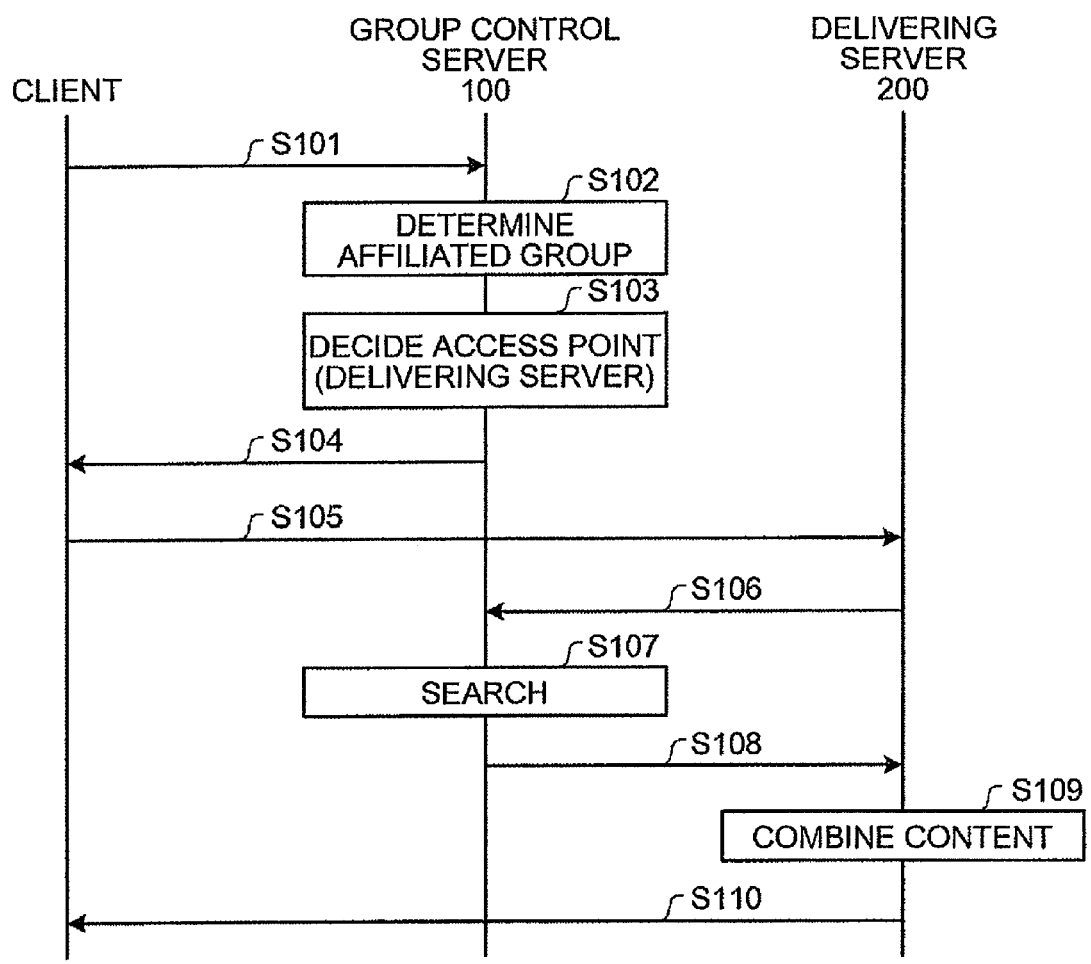
FIG. 6 is a schematic of an example of an attribute content DB according to the first embodiment.
FIG. 7 is a flowchart of an operation of the content delivering system according to the first embodiment.

The attribute content DB 203 stores therein the attribute content data. Further, as shown in FIG. 6, for example, the attribute content DB 203 can differentiate and store therein the respective attribute content and need not classify the attribute content according to the assigned content.

The delivery request retriever 204 retrieves the delivery request that is received by the receiver 201 from the client, and notifies the content combining unit 208 the content that is requested to be delivered. Further, the delivery request retriever 204 notifies the attribute content-enquiring unit 205 the address of the delivery request source client.

The attribute content-enquiring unit 205 transmits to the group control server 100 via the transmitter 209 the address of the delivery request source client, and enquires the attribute content that need to be delivered to the client.

The content DB 206 stores therein data of multiple contents such as the moving images that are delivered to the client.

The attribute content data-retriever 207 retrieves from the group control server 100 the attribute content data that is received by the receiver 201, and notifies the content combining unit 208 the attribute content that need to be delivered to the delivery request source client.

The content combining unit 208 reads from the content DB 206 the content that is notified from the delivery request retriever 204, reads from the attribute content DB 203 the attribute content that are notified from the attribute content data-retriever 207, and combines the read content and the attribute content. Next, the content combining unit 208 transmits to the delivery request source client via the transmitter 209 content data that is obtained by combining the content and the attribute content.

Figure 8:
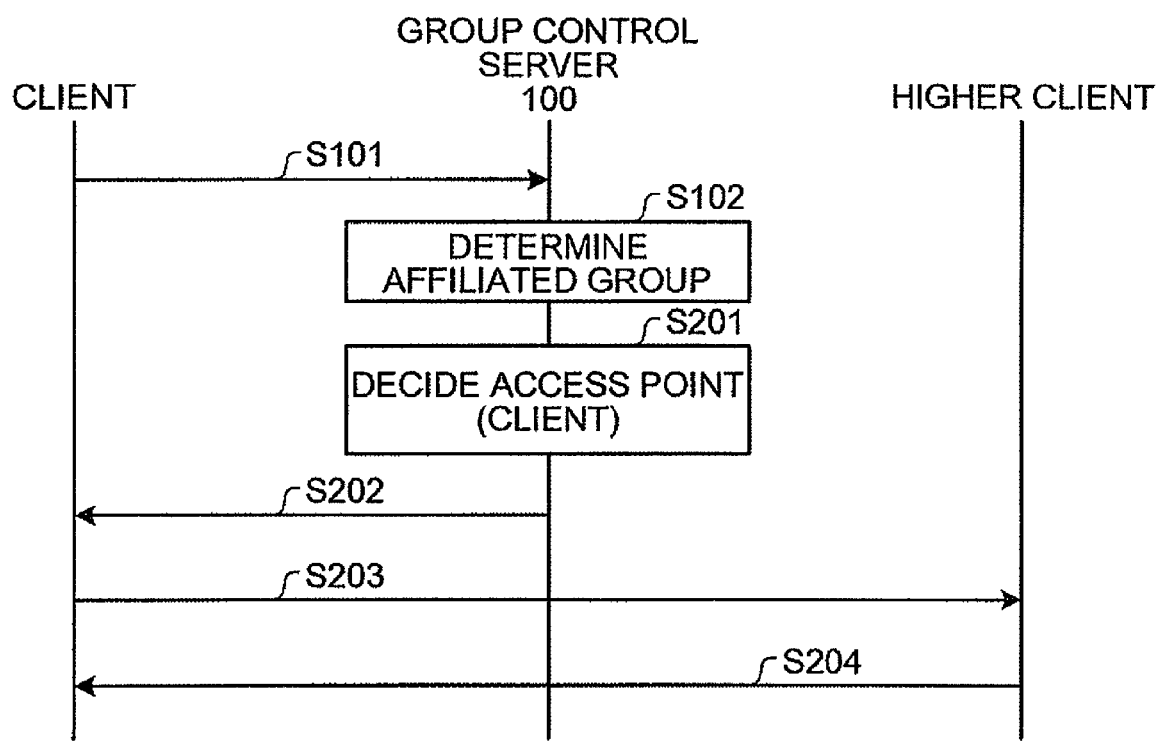
FIG. 8 is a flowchart of another operation of the content delivering system according to the first embodiment.

An operation of the content delivering system, which includes the aforementioned group control server 100 and the delivering server 200, is explained in the following with reference to flowcharts that are shown in FIGS. 7 and 8. In the operation of the content delivering system explained with reference to FIG. 7, the delivering server 200 is decided as the access point of the client. In the operation of the content delivering system explained with reference to FIG. 8, the other client is decided as the access point of the client.

Regardless of whether the access point is the delivering server 200 or the other client, the group data related to the grouping corresponding to the attribute contents are preliminarily transmitted from the attribute content server 300 to the group control server 100, and data of the actual attribute content is preliminarily transmitted from the attribute content server 300 to the delivering server 200. Thus, in the group control server 100, the group data retriever 102 retrieves the group data, and the group according to the respective attribute content is stored in the group DB 103. In the delivering server 200, the attribute content retriever 202 retrieves data of all the attribute contents that are likely to be delivered from the delivering server 200, and the data of the attribute contents is stored in the attribute content DB 203.

As shown in FIG. 7, if the user desires the delivery of the content, the participation request including the identification data of the desired content and the attribute of the user is transmitted from the client to the group control server 100 (step S101). The participation request retriever 104 of the group control server 100 retrieves the participation request via the receiver 101, and notifies the affiliated group-determining unit 105 the identification data of the desired content and the attribute of the user included in the participation request. The affiliated group-determining unit 105 refers to the group DB 103, and determines, from the groups corresponding to the attribute contents that are likely to be assigned to the desired content, the affiliated group that includes the attribute of the user (step S102).

In other words, if the attribute contents, which are likely to be assigned to the content desired by the user, are grouped according to the age of the users, the affiliated group-determining unit 105 determines the affiliated group that includes the age of the user. To be further specific, in the group DB 103 shown in FIG. 3, for example, if a 25-year old male user desires the delivery of the content A, the affiliated group-determining unit 105 determines that the client of the user is affiliated to the group of "male in twenties" corresponding to the attribute content A1. Further, if the address of the male user is Kanagawa prefecture, the affiliated group-determining unit 105 determines that the client of the user is affiliated to the group of "Kanto region" corresponding to the attribute content B2.

Upon the affiliated group-determining unit 105 determining the affiliated group of the participation request source client, the data of the client is recorded in the client DB 106. During the registration of the data of the client, because the access point address and the accessed point address of the client are still undecided, the respective columns are left blank. Simultaneously, the affiliated group of the participation request source client is notified to the access point-deciding unit 107, and the access point-deciding unit 107 decides the access point. In the example shown in FIG. 7, the delivering server 200 is decided as the access point of the participation request source client (step S103).

Deciding the access point by the access point-deciding unit 107 is explained below. The access point-deciding unit 107 determines whether the other client which corresponds to the same desired content and the same affiliated group as that of the participation request source client is already registered in the client DB 106. If the other client is not registered, the delivering server 200 is decided as the access point. However, even if the registered client exists, if a large number of the accessed point addresses which are connected below the registered client is already registered and a load of the registered client has exceeded a predetermined standard, or if the geographical distance between the registered client and the participation request source client exceeds a predetermined distance, the access point-deciding unit 107 decides the delivering server 200 as the access point of the participation request source client.

Upon the access point-deciding unit 107 deciding the delivering server 200 as the access point, the address of the delivering server 200 is registered in the client DB 106 as the access point address corresponding to the participation request source client. Further, the access point-deciding unit 107 transmits the address of the delivering server 200 to the participation request source client via the transmitter 110 (step S104). Accordingly, the client which has transmitted the participation request can grasp that the delivery request is needed to be transmitted to the delivering server 200 for receiving the delivery of the content.

Next, the client transmits to the delivering server 200 the delivery request for the delivery of the desired content (step S105). The delivery request retriever 204 of the delivering server 200 retrieves the delivery request via the receiver 201. The delivery request retriever 204 notifies the content combining unit 208 the content that is desired by the client, and notifies the attribute content-enquiring unit 205 the address of the delivery request source client. Next, the attribute content-enquiring unit 205 transmits the address of the delivery request source client to the group control server 100 via the transmitter 209, and enquires the group control server 100 about the attribute content that need to be delivered to the client (step S106).

The address retriever 108 of the group control server 100 retrieves via the receiver 101 the client address that is transmitted from the delivering server 200, and outputs the retrieved client address to the attribute content-searching unit 109. Next, the attribute content-searching unit 109 searches from the client DB 106 the attribute content corresponding to the client address (step S107). In other words, the attribute content-searching unit 109 detects from the client DB 106 the address of the client that issued the delivery request, and retrieves the recorded attribute content data corresponding to the address. The attribute content-searching unit 109 transmits the attribute content data to the delivering server 200 via the transmitter 110 (step S108).

The attribute content data-retriever 207 of the delivering server 200 retrieves via the receiver 201 the attribute content data that is transmitted from the group control server 100, and notifies the content combining unit 208 the attribute content that need to be delivered to the delivery request source client. Thus, because the content combining unit 208 is notified of the content and the attribute content that is to be delivered to the delivery request source client, the content combining unit 208 reads the content from the content DB 206, reads the attribute content from the attribute content DB 203, and combines the read content and the attribute content (step S109). The content combining unit 208 transmits to the delivery request source client via the transmitter 209 the content data that is obtained by combining the content and the attribute content (step S110).

Thus, the client can receive the delivery of the content that is desired by the user, and provide the content to the user by displaying and reproducing the content. The attribute content corresponding to the attribute of the user is assigned to the content, and the attribute content for a specified delivery target can also be provided to the user. Accordingly, if the attribute content is in the form of an advertisement, the product or the service can be advertised to the user who is likely to be highly interested therein, and the appeal of the advertisement can be enhanced.

In the operation of the content delivering system explained in the following with reference to FIG. 8, the other client is decided as the access point of the client. Components, which are the same as the respective components shown in FIG. 7, are indicated using the same reference numerals and a detailed explanation is omitted.

As shown in FIG. 8, if the user desires the delivery of the content, the participation request is transmitted from the client to the group control server 100 (step S101). The participation request retriever 104 of the group control server 100 retrieves the participation request via the receiver 101, and notifies the affiliated group-determining unit 105 the identification data of the desired content and the attribute of the user that are included in the participation request. Next, the affiliated group-determining unit 105 determines, from the groups corresponding to the desired content, the group to which the user is affiliated (step S102).

Upon the affiliated group-determining unit 105 determining the affiliated group of the participation request source client, data of the client is registered in the client DB 106. During the registration of the data of the client, because the access point address and the accessed point address of the client are still undecided, the respective columns are left blank. Simultaneously, the affiliated group of the participation request source client is notified to the access point-deciding unit 107, and the access point-deciding unit 107 decides the access point. In the example shown in FIG. 8, the other client is decided as the access point of the participation request source client (step S201).

Deciding the access point by the access point-deciding unit 107 is explained below. The access point-deciding unit 107 determines whether the client which corresponds to the same desired content and the same affiliated group as that of the participation request source client is already registered in the client DB 106. If the other client corresponding to the same desired content and the same affiliated group as that of the participation request source client is already registered, the access point-deciding unit 107 determines that the registered client can be treated as the higher client. If the registered client includes a client such that a load of the client is less than the predetermined standard and the geographical distance between the client and the participation request source client is less than the predetermined distance, the access point-deciding unit 107 decides the client as the access point of the participation request source client. Thus, the other client which receives the delivery of the same content and that are affiliated to the same group is decided as the access point of the participation request source client to form the tree structure of clients in the affiliated group. Accordingly, the content can be transacted between the clients using P2P streaming, and a process load of the delivering server 200 can be reduced.

Upon the access point-deciding unit 107 deciding the other client as the access point, the address of the decided higher client is registered in the client DB 106 as the access point address corresponding to the participation request source client. Simultaneously, the address of the participation request source client is added to the client DB 106 as the accessed point address corresponding to the higher client. Further, the access point-deciding unit 107 transmits the address of the higher client to the participation request source client via the transmitter 110 (step S202). Accordingly, the client having transmitted the participation request can grasp that the delivery request is needed to be transmitted to the specified higher client for receiving the delivery of the content.

Next, the client transmits the delivery request for the delivery of the desired content to the higher client (step S203). Because the higher client receives the delivery of the content from further higher client or from the delivering server 200, the higher client replicate the delivered content data and deliver the content data to the delivery request source client (step S204). The content data which is delivered from the higher client includes the attribute content that targets the affiliated group of the higher client. However, because the affiliated group of the delivery request source client is the same as the affiliated group of the higher client, the delivered attribute content is also appropriate for the delivery request source client.

Figure 9:
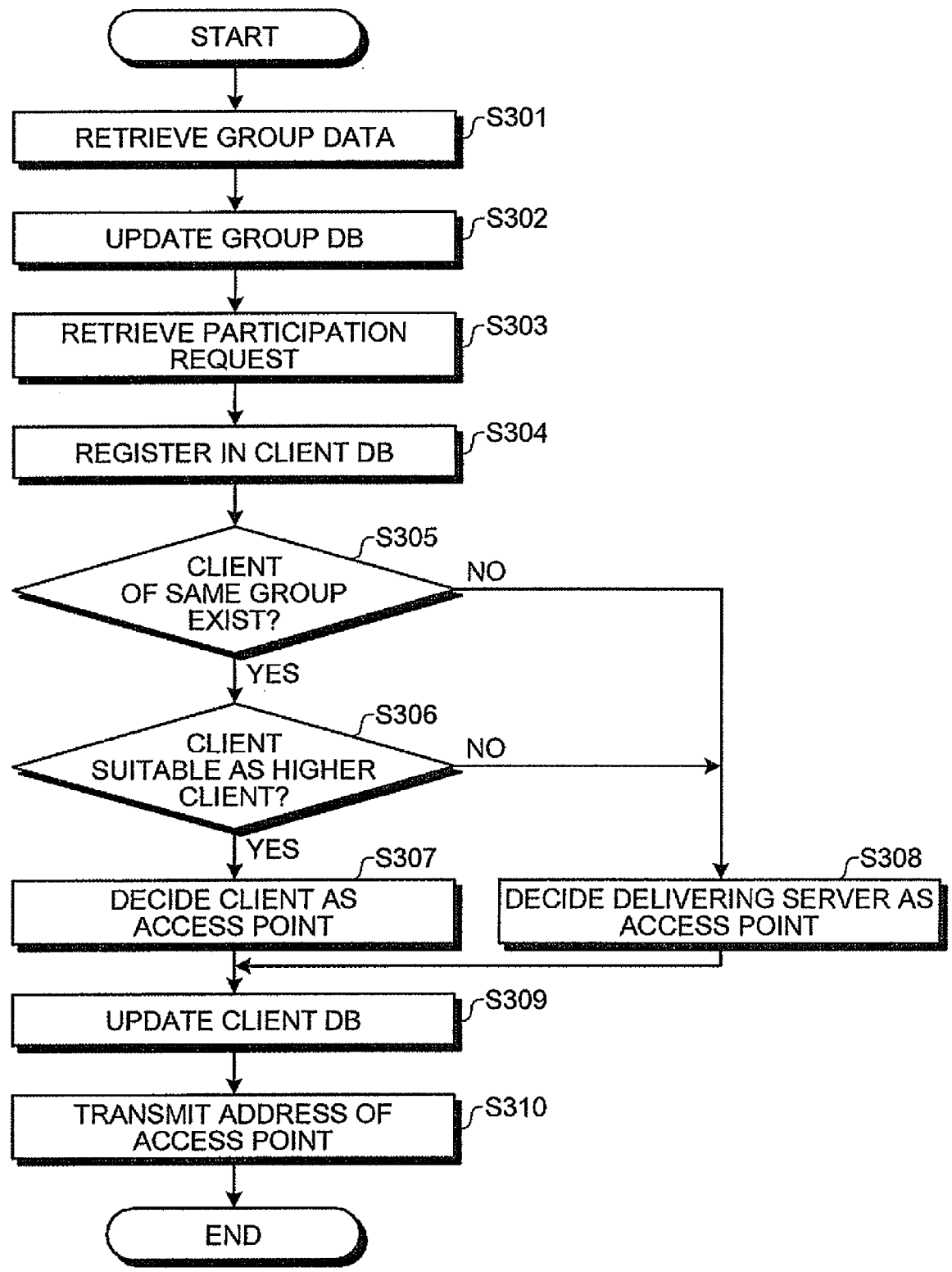
FIG. 9 is a flowchart of an operation of the group control server according to the first embodiment.

Thus, in the present embodiment, the group control server 100 carries out grouping of the client, and forms the tree structure of P2P streaming for each group. Accordingly, the attribute content corresponding to the respective group can be delivered. Further, because the content only needs to be transmitted to the highest client, the process load of the delivering server 200 can be reduced. An operation of the group control server 100 is explained with reference to a flowchart that is shown in FIG. 9.

Before the transmission of the participation request from the client, the attribute content server 300 preliminarily transmits to the group control server 100 the group data that indicates a correspondence relation between the attribute contents that are likely to be assigned to the content and the groups of the attributes of the users corresponding to each attribute content. The group data retriever 102 retrieves the group data via the receiver 101 (step S301), and updates the group DB 103 by registering in the group DB 103 the correspondence relation among the content, the attribute contents, and the groups of the attributes (step S302).

After the group DB 103 is updated, the group control server 100 can receive the participation request from the client, and the participation request retriever 104 retrieves the participation request via the receiver 101 (step S303). Because the participation request includes the identification data of the content that the user desire to be delivered and the attribute of the user, the affiliated group-determining unit 105 refers to the group DB 103 and determines the affiliated group of the user. The affiliated group of the user is determined by selecting the group that matches with the attribute of the user from the groups corresponding to the content desired by the user. Next, data of the participation request source client is registered in the client DB 106 (step S304). During the registration of the data, although the client address, the attribute of the user, the affiliated group, and the like are registered in the client DB 106, because the access point address and the accessed point address are undecided, the respective columns are left blank.

Next, based on the affiliated group of the participation request source client, the access point-deciding unit 107 decides the access point of the client. In other words, first, the access point-deciding unit 107 determines whether the other client corresponding to the same group as the affiliated group of the participation request source client is registered in the client DB 106 (step S305). If the other client which corresponds to the same affiliated group as that of the participation request source client is not registered in the client DB 106 (No at step S305), the access point-deciding unit 107 decides the delivering server 200 as the access point of the participation request source client (step S308).

If the client which corresponds to the same group as that of the participation request source client is registered in the client DB 106 (Yes at step S305), the access point-deciding unit 107 determines whether the registered client includes client that is suitable as the higher client of the participation request source client (step S306). To be specific, for example, if the process load of the client is less than the predetermined standard and the geographical distance between the registered client and the participation request source client is less than the predetermined distance, the registered client is determined to be suitable as the higher client. If the client which is suitable as the higher client does not exist (No at step S306), the access point-deciding unit 107 decides the delivering server 200 as the access point of the participation request source client (step S308). If the client suitable as the higher client exists (Yes at step S306), the access point-deciding unit 107 decides the registered client as the access point of the participation request source client (step S307).

Figure 10:
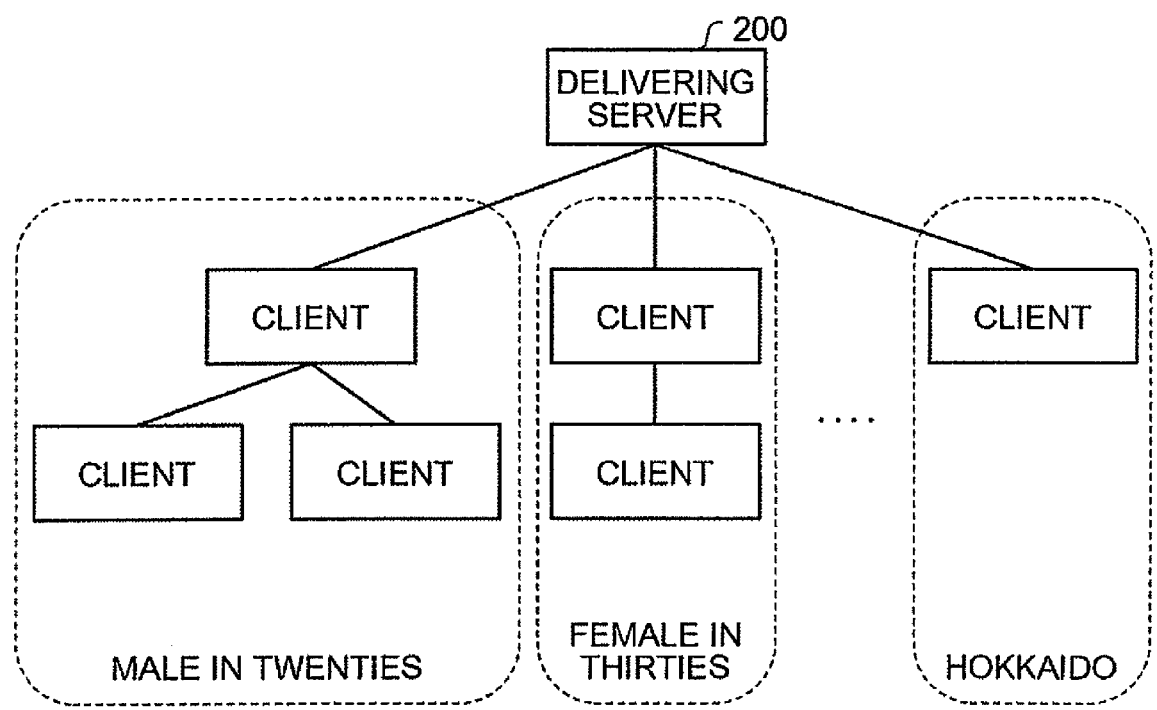
FIG. 10 is a schematic of an example of a tree structure according to the first embodiment.

Thus, when the client transmits the participation request, deciding the access point using the process mentioned earlier enables to form the tree structure that is shown in FIG. 10. In the tree structure, the delivering server 200 is positioned at the highest position and the tree of the clients is formed for the respective affiliated group below the delivering server 200. Accordingly, when delivering the content to a large number of clients, the delivering server 200 does not need to carry out the unicast communication for all the clients, and the process load of the delivering server 200 can be reduced. Further, because each tree below the delivering server 200 is formed for each affiliated group, delivering the attribute content corresponding to the respective trees enables to deliver to all the clients the appropriate attribute content according to the attribute of the user. Further, because the actual delivery of the content is carried out using P2P streaming, a necessity to change the existing network is removed.

Upon the access point-deciding unit 107 deciding the access point of the participation request source client, the access point address is registered in the respective blank column of the client DB 106 and the column is updated (step S309). If the access point is the registered client, the address of the participation request source client is added to the accessed point address of the registered client. Next, the access point-deciding unit 107 transmits the access point address to the participation request source client via the transmitter 110 (step S310).

In the first embodiment, the group control server carries out grouping of the client according to the attribute of the user. After forming the tree structure for each group below the delivering server, the delivering server delivers the content that includes the assigned attribute content according to the attribute of each group. Accordingly, apart from enabling to reduce the process load of the delivering server, the attribute content according to the attribute of the user can be delivered. Thus, a low cost and a large scale delivery of the attribute content such as the advertisement according to the attribute of the user can be realized without carrying out a network change.

Due to a salient feature of a second embodiment of the present invention, when the group control server decides the access point of the client, the identification data, of the attribute content that need to be delivered to the client, is also notified to the client along with the access point address.

Figure 11:
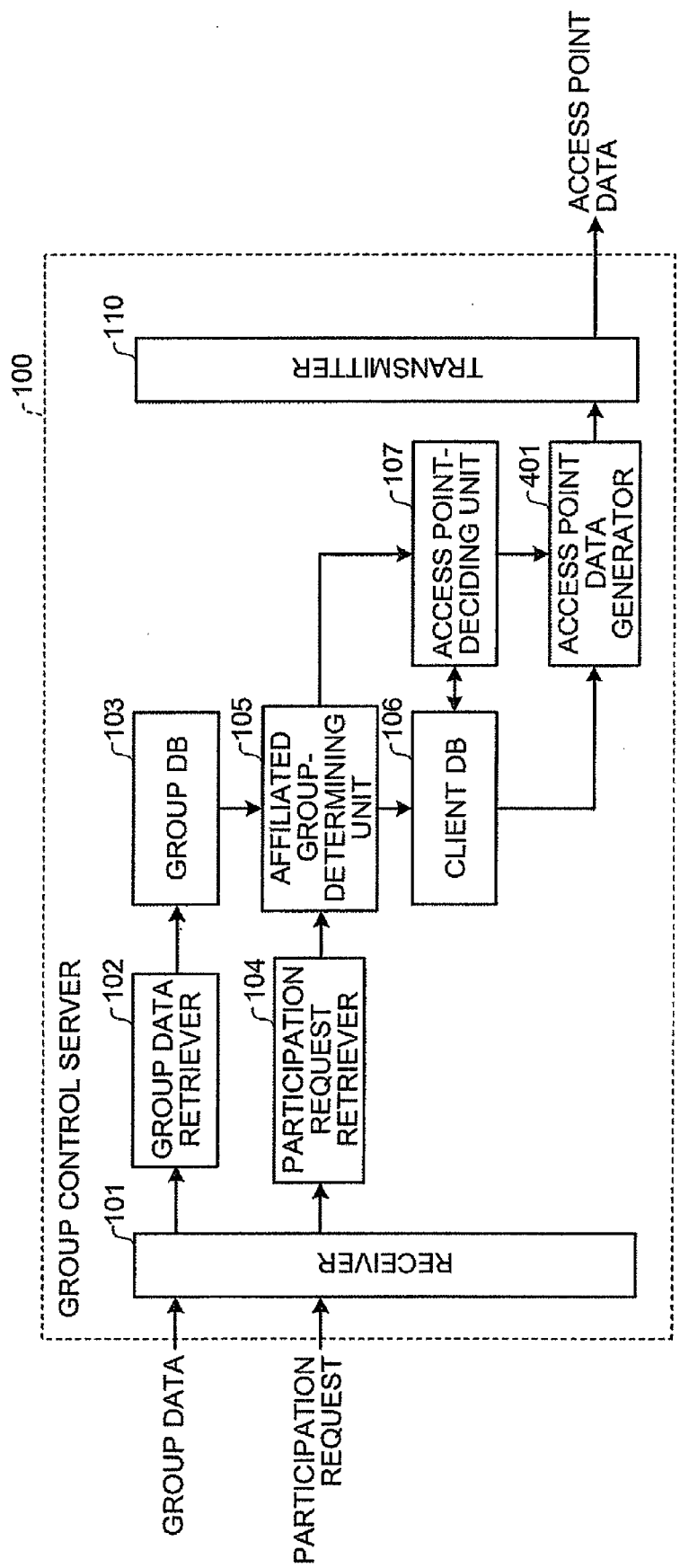
FIG. 11 is a block diagram of a group control server according to a second embodiment of the present invention.

FIG. 11 is a block diagram of the group control server 100 according to the second embodiment. As shown in FIG. 11, components, which are the same as the respective components shown in FIG. 2, are indicated using the same reference numerals and a detailed explanation is omitted. Instead of the address retriever 108 and the attribute content-searching unit 109 that are shown in FIG. 2, the group control server 100 shown in FIG. 11 includes an access point data generator 401.

When the access point-deciding unit 107 decides the access point of the participation request source client, the access point data generator 401 retrieves the access point address, and retrieves from the client DB 106 the identification data of the attribute content needed to be delivered to the participation request source client. Next, the access point data generator 401 generates access point data that includes the retrieved access point address and the identification data of the attribute content, and transmits the access point data to the participation request source client via the transmitter 110.

Figure 12:
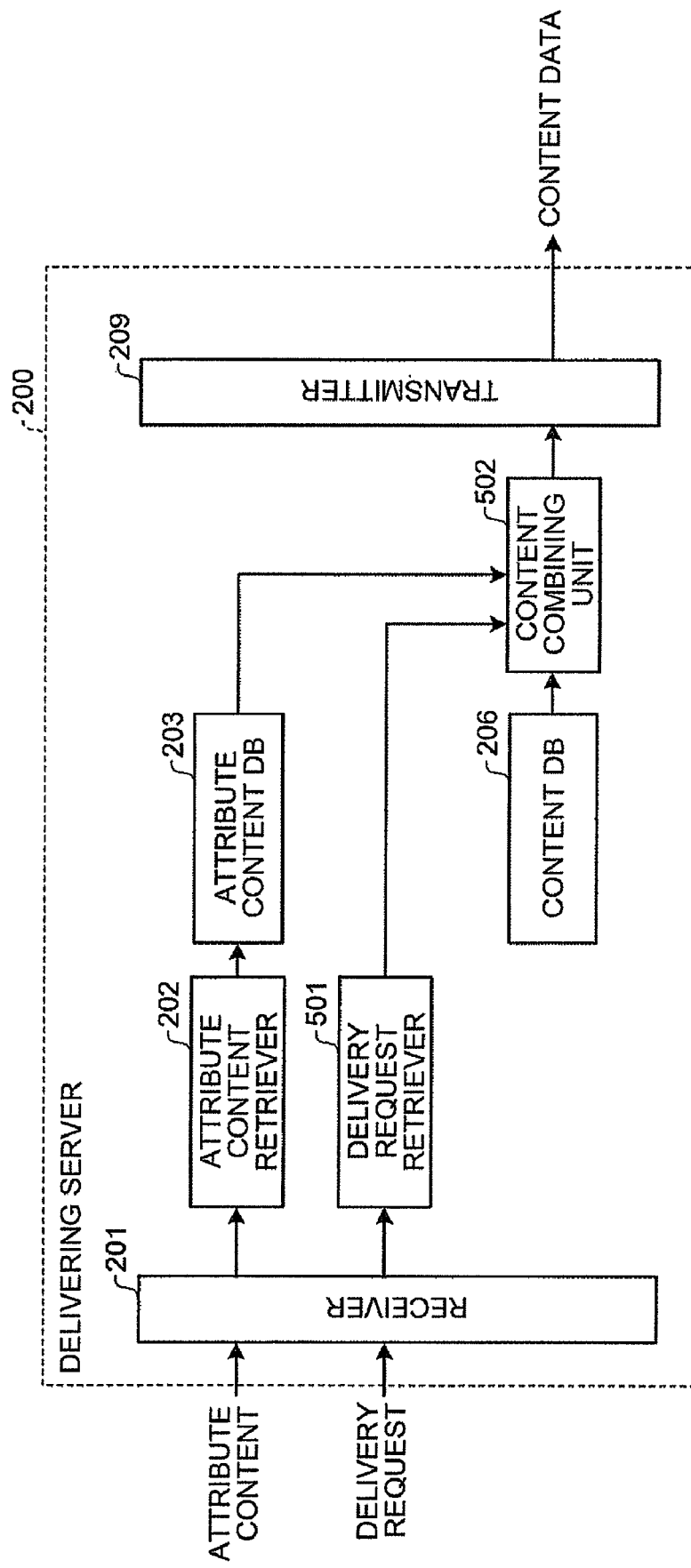
FIG. 12 is a block diagram of a delivering server according to the second embodiment.

FIG. 12 is a block diagram of the delivering server 200 according to the second embodiment. As shown in FIG. 12, components, which are the same as the respective components shown in FIG. 5, are indicated by the same reference numerals and a detailed explanation is omitted. In the delivering server 200 shown in FIG. 12, the attribute content-enquiring unit 205 and the attribute content data-retriever 207 shown in FIG. 5 are removed. Further, instead of the delivery request retriever 204 and the content combining unit 208, the delivering server 200 respectively includes a delivery request retriever 501 and a content combining unit 502.

The delivery request retriever 501 retrieves the delivery request that is received by the receiver 201, and notifies the content combining unit 502 the content that is requested to be delivered and the identification data of the attribute content that is included in the delivery request. In the second embodiment, because the access point address and the identification data of the attribute content are notified to the client by the group control server 100, the client stores in the delivery request the identification data of the desired content and the identification data of the attribute content that is notified from the group control server 100, and transmits the delivery request to the delivering server 200. Accordingly, the delivery request retriever 501 can grasp from the delivery request both the content and the attribute content that is needed to be delivered to the client.

The content combining unit 502 reads from the content DB 206 the content that is notified from the delivery request retriever 501, and reads from the attribute content DB 203 the attribute content that is notified from the delivery request retriever 501. Next, the content combining unit 502 combines the read content and the attribute content. Next, the content combining unit 502 transmits to the delivery request source client via the transmitter 209 the content data that is obtained by combining the content and the attribute content.

Figure 13:
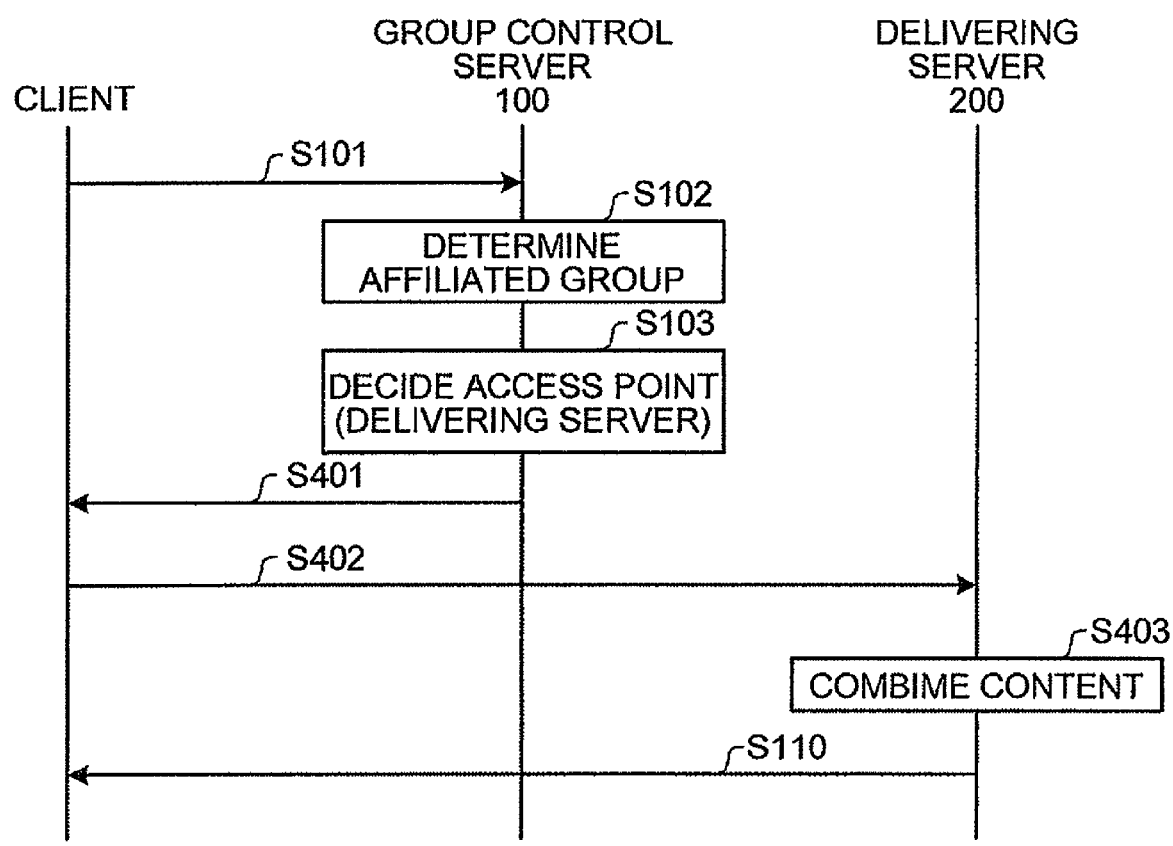
FIG. 13 is a flowchart of an operation of the content delivering system according to the second embodiment.

The operation of the content delivering system, which includes the group control server 100 and the delivering server 200 mentioned earlier, is explained in the following with reference to a flowchart that is shown in FIG. 13. Because the operation of the content delivering system according to the second embodiment is the same as the operation of the content delivering system according to the first embodiment when other client is decided as the access point of the client, the operation explained below is carried out when the delivering server 200 is decided as the access point of the client. As shown in FIG. 13, components, which are the same as the respective components shown in FIG. 7, are indicated by the same reference numerals and a detailed explanation is omitted. Similarly as in the first embodiment, the attribute content server 300 preliminarily transmits the group data to the group control server 100, and preliminarily transmits data of the actual attribute contents to the delivering server 200.

When the user desires the delivery of the content, the client transmits to the group control server 100 the participation request that includes the identification data of the desired content and the attribute of the user (step S101). The participation request retriever 104 of the group control server 100 retrieves the participation request via the receiver 101. The participation request retriever 104 notifies the affiliated group-determining unit 105 the identification data of the desired content and the attribute of the user that are included in the participation request. The affiliated group-determining unit 105 refers to the group DB 103, and determines, from the groups corresponding to the attribute contents that are likely to be assigned to the desired content, the affiliated group that includes the attribute of the user (step S102).

Upon the affiliated group-determining unit 105 determining the affiliated group of the participation request source client, data of the client is registered in the client DB 106. When registering the data of the client, because the access point address and the accessed point address of the client are undecided, the respective columns in the client DB 106 are left blank. Simultaneously, the affiliated group of the participation request source client is notified to the access point-deciding unit 107, and the access point-deciding unit 107 decides the access point of the client. In the example shown in FIG. 13, the delivering server 200 is decided as the access point of the participation request source client (step S103).

Upon the access point-deciding unit 107 deciding the delivering server 200 as the access point of the client, the address of the delivering server 200 is registered in the client DB 106 as the access point address corresponding to the participation request source client. The access point address is output to the access point data generator 401. The access point data generator 401 generates the access point data that includes the access point address and the identification data of the attribute content that are stored in the client DB 106 by establishing a correspondence with the participation request source client. Next, the access point data generator 401 transmits the generated access point data to the participation request source client via the transmitter 110 (step S401). Accordingly, the client having transmitted the participation request can grasp that the delivery request is needed to be transmitted to the delivering server 200 for receiving the delivery of the content. Further, the attribute content which is assigned to the content can be notified to the delivering server 200.

Next, the client transmits to the delivering server 200 the delivery request that requests the delivery of the desired content and the attribute content that is assigned to the content (step S402). The delivery request retriever 501 of the delivering server 200 retrieves the delivery request via the receiver 201, and notifies the content combining unit 502 the content and the attribute content that is needed to be delivered to the client. The content combining unit 502 reads the content from the content DB 206 and reads the attribute content from the attribute content DB 203. Next, the content combining unit 502 combines the read content and the attribute content (step S403). Next, the content combining unit 502 transmits to the delivery request source client via the transmitter 209 the content data that is obtained by combining the content and the attribute content (step S110).

In the second embodiment, if the delivering server is decided as the access point of the client, the group control server notifies the client the address of the delivering server and the identification data of the attribute content. The client uses the delivery request to notify the desired content and the attribute content to the delivering server, and receives the delivery of the content and the attribute content. Accordingly, the delivering server which receives the delivery request from the client does not need to enquire the group control server for the attribute content that is needed to be delivered to the client. Thus, the process load of the delivering server can be further reduced.

In the first embodiment, the delivering server 200 enquires the group control server 100 for the attribute content that is needed to be delivered to the client. In the second embodiment, the client notifies the delivering server 200 the attribute content that is assigned to the content. However, upon deciding the delivering server 200 as the access point of the client, the group control server 100 can also notify the delivering server 200 the attribute content that is needed to be delivered to the client.

Figure 14:
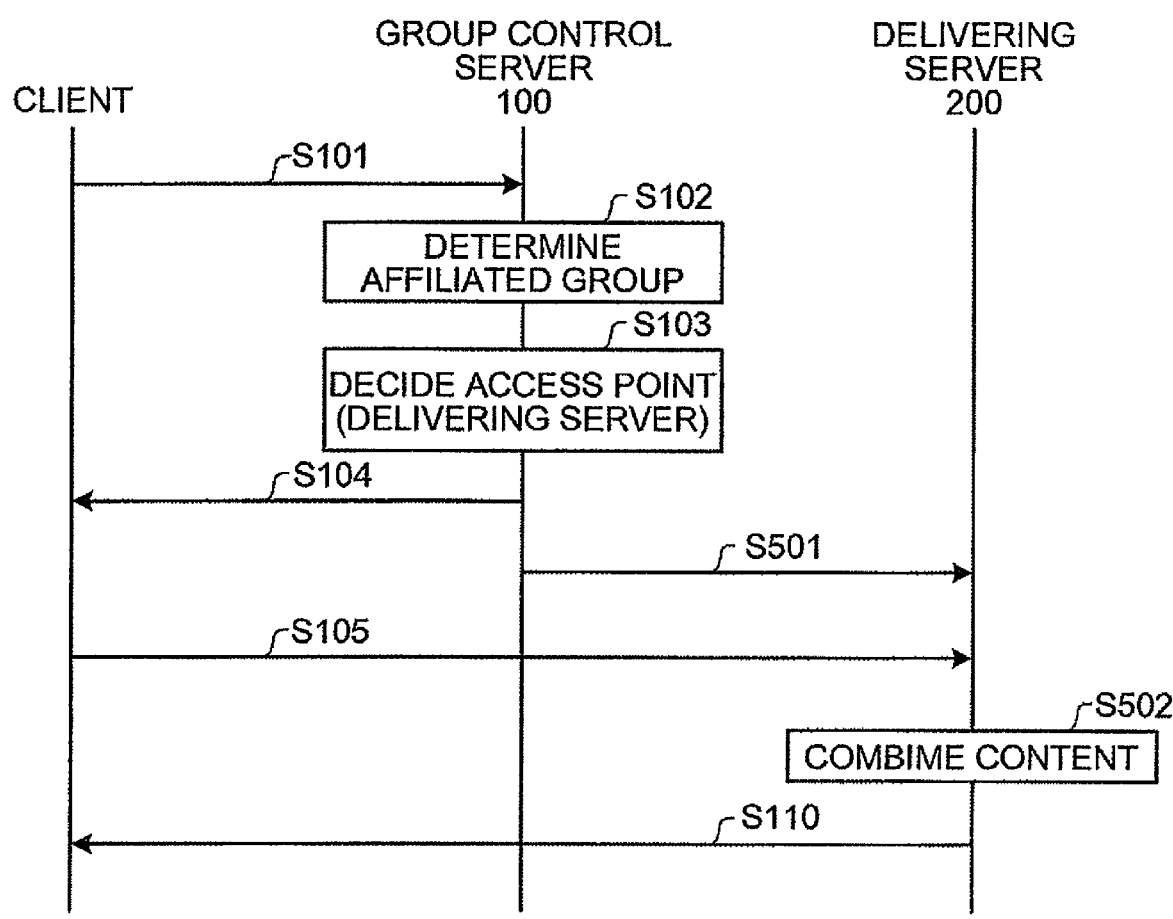
FIG. 14 is a flowchart of another operation of the content delivering system according to the second embodiment.

In an operation of the content delivering system that is explained below with reference to FIG. 14, the group control server 100 notifies the delivering server 200 the attribute content that is needed to be delivered to the client. As shown in FIG. 14, components, which are the same as the respective components shown in FIG. 7, are indicated using the same reference numerals and a detailed explanation is omitted. Further, similarly as in the first embodiment, the attribute content server 300 preliminarily transmits the group data to the group control server 100, and preliminarily transmits data of the actual attribute content to the delivering server 200.

First, when the user desires the delivery of the content, the client transmits to the group control server 100 the participation request that includes the identification data of the desired content and the attribute of the user (step S101). Next, based on the identification data of the desired content and the attribute of the user that are included in the participation request, the group control server 100 determines, from the groups corresponding to the attribute content that are likely to be assigned to the desired content, the affiliated group that includes the attribute of the user (step S102).

Upon the group control server 100 determining the affiliated group of the participation request source client, the data of the client is registered in the client DB 106, and simultaneously, the group control server 100 determines the access point of the participation request source client from the affiliated group of the participation request source client. In the example shown in FIG. 14, the delivering server 200 is decided as the access point of the participation request source client (step S103).

Upon the group control server 100 deciding the delivering server 200 as the access point of the client, the address of the delivering server 200 is transmitted to the participation request source client (step S104). Next, the group control server 100 establishes a correspondence between the address of the client and the identification data of the attribute content that is needed to be delivered to the client, and notifies the correspondence to the delivering server 200 (step S501). Accordingly, the delivering server 200 can grasp the address of the client and the attribute content that is needed to be delivered to the client.

Next, the client transmits to the delivering server 200 the delivery request that requests the delivery of the desired content (step S105). The delivering server 200 reads from the content DB 206 the content that is desired by the client, and reads from the attribute content DB 203 the attribute content that is preliminarily notified from the group control server 100 by establishing the correspondence with the address of the client. Next, the delivering server 200 combines the read content and the attribute content (step S502), and transmits to the client the content data that is obtained by combining the content and the attribute content (step S110).

Thus, the group control server 100 preliminarily notifies the delivering server 200 the attribute content that is needed to be delivered to the client, thereby enabling to enhance the speed of a process when the delivering server has received the delivery request from the client.

In the first and the second embodiments explained earlier, after transmitting the participation request to the group control server 100, the client again transmits the delivery request to the delivering server 200. However, when deciding the access point of the client, because the group control server 100 has already retrieved the identification data of the content that is desired by the client, the group control server 100 can also notify the delivering server 200 the content and the attribute content that are to be assigned to the content along with the client address that is the delivery target. The delivering server 200 can start the delivery of the content without receiving a separate delivery request from the client. When delivering the content without receiving the delivery request, if other client is decided as the access point of the client, the delivering server 200 can also instruct the higher client to replicate the content and to deliver the content to the newly added client.

In the first and the second embodiments explained earlier, the group control server 100, the delivering server 200, and the attribute content server 300 are included separately. However, the aforementioned servers can also be integrated wholly or in part.

According to an embodiment of the present invention, a tree structure, which carries out a delivery of a content between clients, can be formed for each group, and attribute content according to attribute of the group is delivered to the respective tree. Accordingly, a low cost and large scale delivery of the attribute content such as an advertisement according to the attribute of user can be realized without carrying out a network change.

Also, according to an embodiment of the present invention, upon receiving a participation request from a client that is affiliated to a new group, the client can be treated as the highest client of the tree. Thus, the tree for each group can be formed reliably.

Furthermore, according to an embodiment of the present invention, apart from delivering the content that is requested by the client, the attribute content according to the affiliated group of the client can also be delivered.

Still further, according to an embodiment of the present invention, even if a delivering server has not stored therein a correspondence relation between the group and the attribute content, the appropriate attribute content can be delivered from the delivering server to the client.

Still further, according to an embodiment of the present invention, a delivery request, which is received from the client, enables to identify the attribute content that is needed to be delivered to the client, thereby enabling to easily deliver the appropriate attribute content from the delivering server to the client.

Still further, according to an embodiment of the present invention, even if a plurality of clients are affiliated to the same group, all the clients need not receive the delivery of the content from the delivering server. Thus, a process load of the delivering server can be reliably reduced.

Still further, according to an embodiment of the present invention, even if new client is affiliated to the same group, the new client is not connected to the client that is already connected to a large number of lower clients. Thus, content delivery of the entire network can be smoothly executed.

Still further, according to an embodiment of the present invention, even if other client is affiliated to the same group, the other client that is distant from each other is not connected. Thus, an increase in the load of the entire network can be prevented.

Still further, according to an embodiment of the present invention, the appropriate attribute content, which is needed to be delivered to source client, can be grasped reliably. Further, upon receiving the participation request from other client, whether the source client is affiliated to the same group can also be confirmed.

Still further, according to an embodiment of the present invention, the tree structure that is formed can be stored and connections among the clients can be controlled.

Still further, according to an embodiment of the present invention, the advertisement of a product or a service, which is likely to highly appeal to a user based on an age group, a gender or an address of the users, is treated as the attribute content. Thus, an appeal of the product or the service for the user can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A content delivering system that delivers content to a client through a peer-to-peer streaming, the content delivering system comprising:
    a receiver that receives a request for content delivery from the client;
    a determining unit that stores therein a combination of an attribute reflecting a user's preference and an affiliated group, and that determines an affiliated group of the client according to the attribute corresponding to the client;
    a storage device that stores therein data related to the client, the data including data of the affiliated group determined by the determining unit;
    a deciding unit that decides, a delivering server as an access point of the client when another client affiliated to the affiliated group determined by the determining unit is not registered in the storage device, and the other client as the access point of the client when the other client affiliated to the affiliated group determined by the determining unit is registered in the storage unit; and
    a notifying unit that notifies the access point decided by the deciding unit to the client.

2. The content delivering system according to claim 1, wherein the delivering server includes
    a retriever that retrieves an attribute content that differs for an attribute of each group and that corresponds to the affiliated group of the source client, and
    a transmitter that transmits to the client the requested content and the attribute content.

3. The content delivering system according to claim 2, wherein the retriever further includes an enquiring unit that enquires of the attribute content corresponding to the affiliated group of the client.

4. The content delivering system according to claim 2, wherein the retriever retrieves the attribute content that is identified by identification data.

5. The content delivering system according to claim 1, wherein the deciding unit decides the other client as the access point of the client, when a process load of the other client is less than a predetermined standard.

6. The content delivering system according to claim 1, wherein the deciding unit decides the registered client as the access point of the client, when a geographical distance between the other client and the source client is less than a predetermined distance.

7. The content delivering system according to claim 1, wherein the storage device establishes a correspondence between an address of the client and the attribute information, the affiliated group, and the attribute content corresponding to the affiliated group, and stores the correspondence.

8. The content delivering system according to claim 7, wherein the storage device adds and stores an address of the decided access point, after the deciding unit decides the access point of the client.

9. The content delivering system according to claim 1, wherein the determining unit determines the affiliated group based on at least one of an age, a gender, and an address of a user of the client.

10. The content delivering system according to claim 1, wherein the delivering server retrieves a content and an attribute content differing for an attribute of each affiliated group and corresponding to the affiliated group of the client and transmits the content and the attribute content retrieved to the client via the access point decided by the deciding unit, the content retrieved being requested through the request from the client.

11. A server that delivers content to a client through a peer-to-peer streaming, the server comprising:
 a receiver that receives a request for content delivery from the client;
 a determining unit that stores therein a combination of an attribute reflecting a user's preference and an affiliated group, and that determines the affiliated group of the client according to the attribute corresponding to the client;
 a storage device that stores data related to the client, the data including data of the affiliated group determined by the determining unit;
 a deciding unit that decides, a delivering server as an access point of the client when another client affiliated to the affiliated group determined by the determining unit is not registered in the storage device, and the other client as the access point of the client when the other client affiliated to the affiliated group determined by the determining unit is registered in the storage unit; and
 a notifying unit that notifies the access point decided by the deciding unit to the client.

12. The server according to claim 11, wherein the delivering server retrieves a content and an attribute content differing for an attribute of each group and corresponding to the affiliated group of the client and transmits the content and the attribute content retrieved to the client via the access point decided by the deciding unit, the content retrieved being requested through the request from the client.

13. A content delivering method for delivering content to a client through a peer-to-peer streaming, the content delivering method comprising:
 receiving a request for content delivery from the client;
 determining an affiliated group of the client according to an attribute reflecting a user's preference corresponding to the client by using a storing combination of the attribute and the affiliated group;
 registering, in a database, data related to the source client, the data including data of the affiliated group;
 deciding, a delivering server as an access point of the client when another client affiliated to the affiliated group determined by the determining is not registered in the database, and the other client as the access point of the client when the other client affiliated to the affiliated group determined by the determining is registered in the database; and
 notifying the source client the access point decided to the client.

14. The content delivering method according to claim 13 further comprising:
 retrieving a content and an attribute content differing for an attribute of each group and corresponding to the affiliated group of the client; and
 transmitting the content and the attribute content to the client over the access point decided by the deciding, the content being requested through the request from the client.

\* \* \* \* \*